United States Patent Office 2,901,987
Patented Sept. 1, 1959

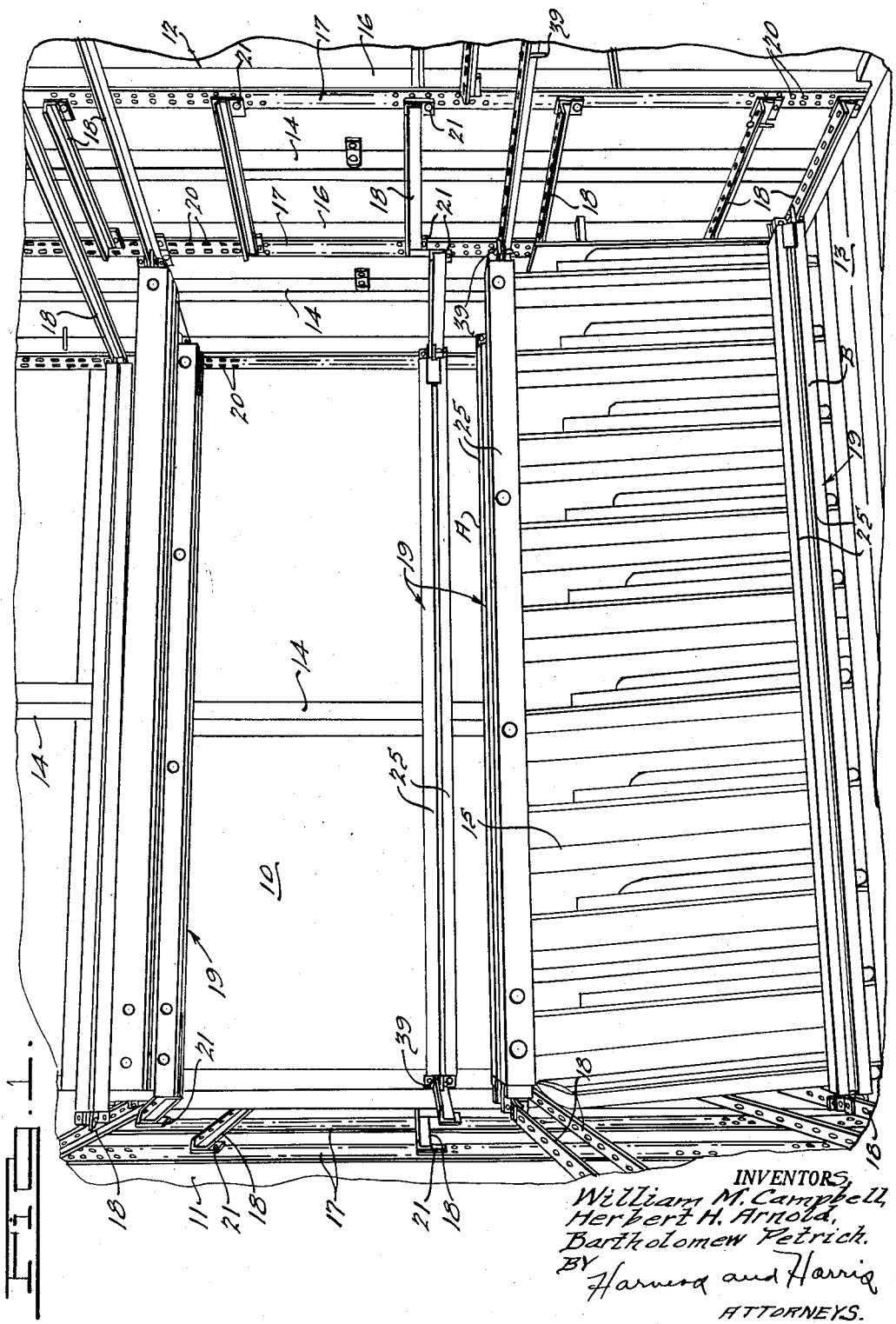

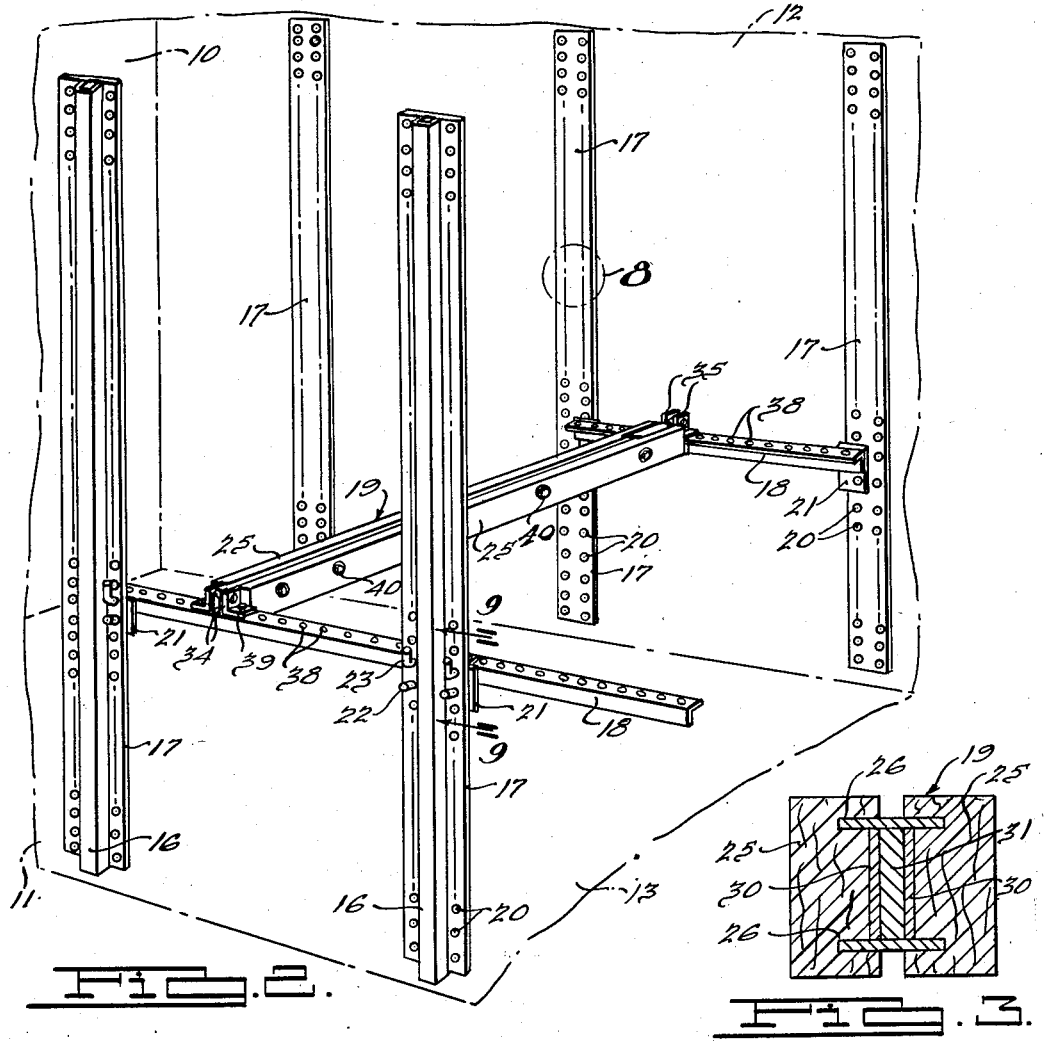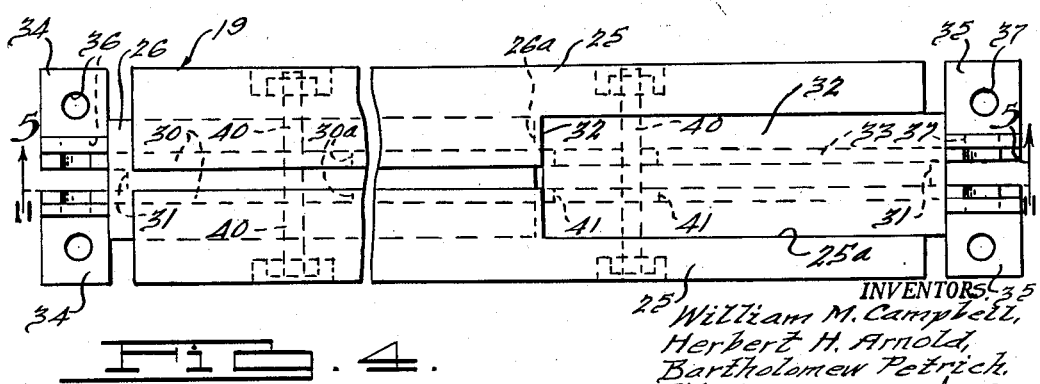

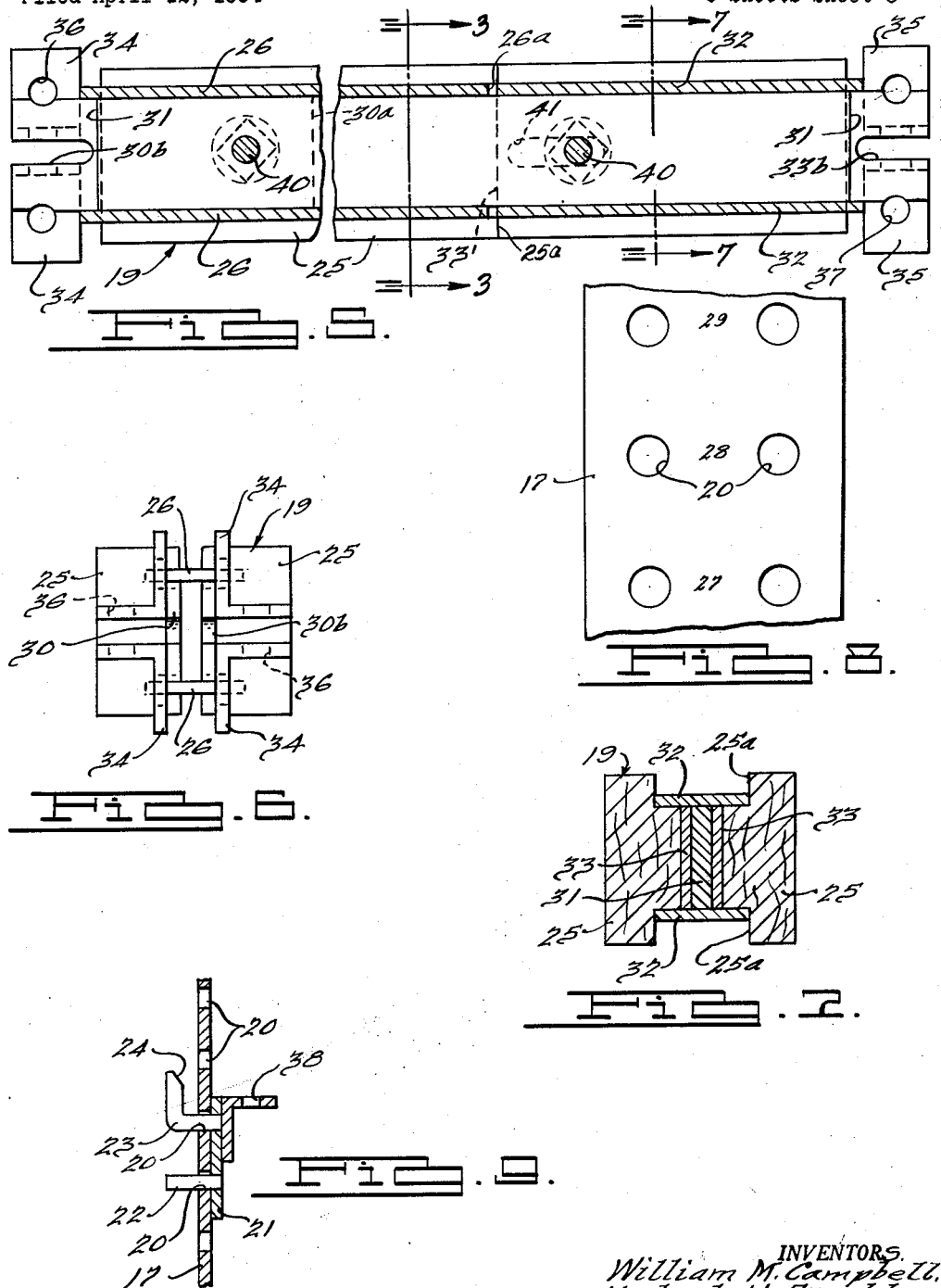

2,901,987

CAR LOADING APPARATUS

William M. Campbell, Herbert H. Arnold, and Bartholomew Petrich, Detroit, Mich., assignors to Chrysler Corporation, Highland Park, Mich., a corporation of Delaware Application April 12, 1954, Serial No. 422,328

5 Claims. (Cl. 105—369)

This invention relates to car loading apparatus and in particular to adjustable dunnage suitable for use in railway box cars for bracing or supporting automobile body panels during shipment, although it will be apparent that the present invention is adaptable for use with other types and shapes of freight.

A major problem involved in shipping automobile body panels from the manufacturing to the assembling plant is the provision of suitable dunnage adjustable to accommodate different types of body panels resulting from frequent changes in body styles. It is accordingly an important object of the present invention to provide an improved, simplified and versatile bracing means for use within the interior of box cars, which is readily adjustable for use with body panels or other types of cargo of various shapes.

Another object is to provide such a bracing means comprising a plurality of vertical posts adjacent the opposite sidewalls of the box car and a plurality of horizontal belt rail bars extending longitudinally of the box car at its opposite sides and secured to the vertical posts at vertically adjusted positions. Extending transversely across the box car are a plurality of transversely extensible cross bars secured at their opposite ends to the belt rail bars at longitudinally adjusted positions. The cross bars are of improved economical construction whereby each bar is readily adaptable for use as a brace against either vertical or horizontal forces exerted thereon and are readily adjustable both vertically and longitudinally of the box car by virtue of the foregoing structure so as to extend firmly against the cargo in supporting relation.

Another object is to provide an improved cross bar of the above character comprising a pair of coextensive wood beams of generally rectangular section extending side by side transversely of the box car with their broader edges confronting each other. Extending lengthwise of the beams and projecting endwise therefrom toward one side of the box car is a steel plate means embedded within the beams in reinforcing relation and secured thereto to hold the beams in fixed spaced relationship with respect to each other. Also extending lengthwise of the beams and projecting endwise therefrom at the other side of the box car is a second plate means similar in cross section to the first plate means and engaged with the beams in supporting relation. The two plate means are provided with telescoping portions in endwise sliding engagement. The endwise projecting portions of the two plate means are each provided with a pair of orthogonally crossing notches. Each notch is parallel to an edge of the beams and is adapted when arranged horizontally to receive a portion of a belt rail bar therein, whereby the cross bar is supported at its opposite ends by the belt rails and is slidable longitudinally thereof to adjusted positions whereat the plate end portions and belt rails are releasably connected against relative movement.

By virtue of the foregoing structure, the cross bar is readily extensible transversely of the box car to accommodate for vibration and heaving of the sidewalls during travel. In addition, a single cross bar construction is readily usable for bracing against either vertical or horizontal forces merely by arranging the planes of the broad edges of the cross bar beams perpendicularly to the expected force.

Other objects of this invention will appear in the following description and appended claims, reference being had to the accompanying drawings forming a part of this specification wherein like reference characters designate corresponding parts in the several views.

Fig. 1 is a fragmentary perspective view looking toward the interior of one end of a box car embodying the present invention.

Fig. 2 is a fragmentary view showing the dunnage construction, the outline of the box car being shown in phantom.

Fig. 3 is an enlarged vertical section through the cross bar, taken in the direction of the arrows substantially along the line 3—3 of Figure 5.

Fig. 4 is a fragmentary enlarged plan view of the cross bar.

Fig. 5 is a fragmentary vertical section taken in the direction of the arrows substantially along the line 5—5 of Fig. 4.

Fig. 6 is an end view of the cross bar, taken from the left end of Fig. 4.

Fig. 7 is a vertical section taken in the direction of the arrows substantially along the line 7—7 of Fig. 5.

Fig. 8 is a fragmentary enlarged elevation showing substantially the portion of the wall post enclosed within the circle 8 of Fig. 2.

Fig. 9 is an enlarged vertical section taken in the direction of the arrows substantially along the line 9—9 of Fig. 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in application bracing a cargo of automobile body panels within a railway box car comprising the end wall 10, sidewalls 11 and 12, and customary flooring 13. In accordance with customary practice, a number of pillars 14 brace the end and sidewalls. The body panels indicated generally by the numeral 15 are arranged side by side transversely across the floor of the box car with their broad surfaces in juxtaposition.

In order to hold the panels 15 in position, a plurality of vertical steel wall posts are provided along the opposite sidewalls 11 and 12, each post comprising a pillar 16 of channel section, Fig. 2, secured to the adjacent sidewall and having an inner face plate 17 secured thereto. Each plate 17 is parallel to the sidewalls and spaced therefrom and overlaps the attached pillar 16 longitudinally of the box car to complete a post of generally T-section. A plurality of belt rail bars 18 of various lengths extend longitudinally of the box car at opposite sides and are supported at their ends by pairs of the vertical posts 16, 17 as described below. Each bar 18 spans two or more of the vertical posts depending upon the length desired. Extending transversely of the box car are a plurality of cross bars 19 which are secured at their ends to the belt rail bars as described below.

In order to support the belt rail bars 18 at vertically adjusted positions, each plate 17 is provided with two vertical columns of pin holes 20, one column at each side of the pillar 16 to which the plate is secured. The holes 20 are uniformly spaced vertically and the distance of each from the floor 13 is indicated by an identifying numeral, as for example the numerals 27, 28 and 29 marked on the plate 17, Fig. 8. Thus all the pin holes 20 at the same elevation are identified by equal numerals to facilitate leveling of the bars 18 and 19.

Each belt rail bar 18 comprises an angle iron having a vertical and a horizontal flange. Secured to the vertical flange at opposite ends of each bar 18 are vertical end plates 21, Fig. 9, each plate 21 having a pair of pins 22 and 23 extending outwardly therefrom and removably insertable through a pair of juxtaposed pin holes 20 in one of the vertical columns of said holes. Each pin 23 bends upward at a location spaced outwardly of the plate 17 to which it is attached, thereby interlocking with the plate to prevent accidental detachment of the bar 18. By pulling the bar 18 inwardly and rocking its lower end upwardly or counterclockwise in Fig. 9, the bar 18 is readily separated from the plates 17. The bar 18 is secured to the plates 17 in vertically adjusted position by inserting the tapered upper ends 24 of the pins 23 through the desired pin holes 20, with the plates 21 horizontal, and thereafter rocking the bar 18 clockwise with the elbow of the pins 23 within the holes 20 until the plates 21 are swung into parallelism with the plates 17. In the same motion the lower pins 22 are inserted through the corresponding next lower pin holes 20. As shown in the drawings, each belt rail bar 18 terminates at each end intermediate the two vertical columns of the holes 20 in the adjacent plate 17. Thus juxtaposed ends of two bars 18 can be secured to the same plate 17 in end-to-end alignment where desired without interference with each other.

Each cross bar comprises two parallel coextensive wood beams 25 of generally rectangular section, as for example 2" x 4", which extend substantially the width of the box car with their broad edges confronting each other. Spacing the beams 25 and extending lengthwise thereof from their left ends of Fig. 4 to adjacent their right ends are a pair of parallel long spacer plates 26 having opposite edges recessed perpendicularly into the confronting broad edges of the beams 25 adjacent the latter's narrow edges, Fig. 3. Also extending lengthwise of the beams 25 from their left ends and spacing the plates 26 are a pair of connector plates 30 secured to the plates 26 and 31. The plates 30 terminate at 30a, are recessed into the confronting broad edges of the beams 25, and are sufficiently long to accommodate a good weld to the plates 26 and bar 31. Extending longitudinally of the beams 25 within the rectangular box section formed by the plates 26 and 30 and secured to these plates is the load sustaining bar 31 of rectangular section having its broad edges parallel to the plates 30 and having its end disposed in substantially the same plane as the ends of the beams 25, Fig. 4.

Coplanar with the plates 26 and of similar cross sectional size are a pair of short spacer plates 32 which extend to the right from adjacent the ends 26a and project beyond the right ends of the beams 25, Fig. 5. Also similar in cross sectional size to the plates 30 and coplanar therewith are a pair of short connector plates 33 which space and are connected to the plates 32 to comprise a box section adapted to receive the right end of bar 31 therein in mutually telescoping and supporting relation. To facilitate relative sliding between plates 32, 33 and the beams 25, the outer portions of the beams are rabbeted at 25a at the regions of the plates 32, 33 to avoid binding the latter.

Connected to the plates 26 and 30 at the left end of the cross bar 19, Fig. 4, are four angle brackets 34 arranged as shown in Fig. 6 to provide a pair of endwise opening slots crossing each other perpendicularly in the manner of a Geneva cross, each slot being parallel to one pair of the edges of the beams 25. Similarly secured to the right ends of the plates 32 and 33 are four angle brackets 35 also arranged to provide a pair of crossing endwise opening slots, one of each corresponding to and being parallel to one of each of the aforesaid slots at the left end. The left ends of plates 30 and the right ends of plates 33 extend endwise beyond the beams 25 sufficiently to provide supports to which the brackets 34 and 35 are secured and are recessed at 30b and 33b respectively, Fig. 5, so as not to block the aforesaid endwise opening slots formed by the brackets 34 and 35.

Each of the latter slots is adapted when arranged horizontally to receive the horizontal flange of any one of the belt rail bars 18 slidably therein, whereby the ends of the cross bar are supported by belt rail bars 18 at opposite sides of the box car and are adjustable longitudinally thereof. Pin holes 36 and 37 in the angle plates 34 and 35 respectively are provided to align with selected pin holes 38 spaced longitudinally in the horizontal flanges of the bars 18. A pair of vertical pins 39 extending through the aligned holes 38, 36 and 38, 37 at each end of the cross bar 19 lock the same against shifting longitudinally of the box car. As an added feature of our invention, we propose to space the holes 38 in t' e rail bars 18 approximately one inch apart. It is our proposal, also, to space the holes 36 and 37 which are in the same plane two and one-half inches apart. In view of the fact that it is necessary to use only one pin 39 at each end of the beams 25, at least one of the holes 36 and 37 will be aligned with a hole 38 for every half inch of adjustment.

A plurality of tie-bolts 40 extending through the broad edges of the beams 25, plates 30, and bar 31, positively secure the beams 25 together. A similar tie bolt 40 at the region of the plates 33 passes through elongated bolt holes 41 which extend transversely of the box car in the plates 33 to permit their endwise sliding with respect to the beams 25 and bar 31.

By virtue of the foregoing construction, the cross bars 19 are reinforced by the plates therein, the right end of bar 31 being snugly confined within the box-section formed by the slidable plates 32 and 33 to limit bowing of the beams either horizontally or vertically. When the latter are placed against the cargo to be braced with their broad edges perpendicular to the cargo, the optimum strength of the beams 25 and bar 31 is available to block displacement of the cargo in the direction toward the beams. Likewise unavoidable play or lost motion permitting limited movement of the plates 32 and 33 perpendicularly to the portion of the bar 31 telescoping therein will be resisted by the beams 25 with optimum effectiveness when the latter are arranged with their broad edges perpendicular to the major expected force.

For example the cross bar 19 located at the position A in Fig. 1 across the tops of the panels 15 is arranged with the broad edges of its beams 25 in vertical planes to brace the panels 15 against vertical movement. The cross bar 19 located at the position B in Fig. 1 across the forward lower edges of the panels 15 is arranged with the broad edges of its beams 25 in horizontal planes to brace the panels 15 against horizontal movement. By virtue of the orthogonal notches formed by the bracket plates 34 and 35, each of the cross beams 19 can be employed in other applications with the broad edges of its beams 25 in either vertical or horizontal planes.

We claim:
1. In an adjustable dunnage construction for a box car, a pair of vertical wall posts at each of the opposite sidewalls of said box car, a pair of belt rail bars extending longitudinally of said box car at the opposite sides thereof and each spanning the pair of wall posts at the same side, means securing each belt rail bar at vertically adjusted positions to the wall posts spanned thereby, a transversely extensible cross bar spanning said pair of belt rail bars and supported thereby, end bracket means secured to the opposite ends of said cross bar, the bracket means at each end having a plurality of V-shaped brackets cooperating to form a pair of endwise opening orthogonal slots therein, each slot being adapted to re- ceive a portion of the adjacent belt rail bar therein for sliding longitudinally thereof when arranged in parallelism therewith, and means for securing said bracket means to said belt rail bars at longitudinally spaced locations.

2. In an adjustable dunnage construction for a box car, a pair of vertical wall posts at each of the opposite sidewalls of said box car, a pair of belt rail bars extending longitudinally of said box car at the opposite sides thereof and each spanning the pair of wall posts at the same side, means securing each belt rail bar at vertically adjusted positions to the wall posts spanned thereby, a cross bar spanning the pair of belt rail bars and supported thereby comprising a pair of beams of rectangular section extending side by side with their broad edges confronting each other and also comprising bracket means secured to said beams and projecting from opposite ends thereof, the bracket means at one end being slidable transversely of said box car with respect to said cross bar, the bracket means at each end having a plurality of substantially V-shaped metal brackets cooperating to form a pair of endwise opening slots therein perpendicular to each other, each slot being also parallel to an edge of said beams and being adapted to receive a portion of the adjacent belt rail bar therein for sliding longitudinally thereof, and means for securing said bracket means to said belt rail bars at locations spaced longitudinally of said box car.

3. In an adjustable dunnage construction for a box car, a cross bar adapted to be secured to longitudinally extending belt rail bars at opposite sides of the box car, end bracket means secured to the opposite ends of said cross bar, the bracket means at one end being slidable transversely of said box car with respect to said cross bar, the bracket means at each end having a plurality of substantially V-shaped brackets having parallel side portions cooperating to form a pair of endwise opening orthogonal slots therein, each slot being adapted to receive a portion of the adjacent belt rail bar therein for sliding longitudinally thereof when arranged in parallelism therewith, and means for securing said bracket means to said belt rail bars at longitudinally spaced locations.

4. In an adjustable dunnage construction for a box car, a cross bar adapted to be secured to longitudinally extending belt rail bars at opposite sides of the box car comprising a pair of beams of rectangular section extending side by side with their broad edges confronting each other and also comprising bracket means secured to said beams and projecting from opposite ends thereof, the bracket means at one end being slidable transversely of said box car with respect to said cross bar, the bracket means at each end having a plurality of substantially V-shaped ported brackets cooperating to form a pair of endwise opening slots therein perpendicular to each other, each slot being also parallel to an edge of said beams and being adapted to receive a portion of the adjacent belt rail bar therein for sliding longitudinally thereof, and pin means extending through a port in one of said brackets for securing said bracket means to said belt rail bars at locations spaced longitudinally of said box car.

5. In a dunnage construction for a load carrying vehicle, a cross bar adapted to be connected to said vehicle comprising an elongated body portion having bracket means at opposite ends adapted to facilitate the securement of said cross bar to said vehicle, said brackets being constructed to form first and second perpendicular slots to accommodate positioning said cross bar in a first position and a second position wherein the entire cross bar is displaced axially 90° about its longitudinal axis from said first position, and reinforcing means carried by said body portion wherein said body portion is more yieldable when subjected to a force from a predetermined direction when said cross bar is in said first position than when in said second position.

References Cited in the file of this patent

UNITED STATES PATENTS

| | | |
|---|---|---|
| 320,079 | Martin | June 16, 1885 |
| 1,242,272 | Thurman | Oct. 9, 1917 |
| 1,258,409 | Hill | Mar. 5, 1918 |
| 1,281,856 | Shaw | Oct. 15, 1918 |
| 1,288,226 | Schrader | Dec. 17, 1918 |
| 1,436,710 | Gruenberg | Nov. 28, 1922 |
| 1,504,523 | Sherer | Aug. 12, 1924 |
| 1,597,091 | McMahan | Aug. 24, 1926 |
| 1,868,638 | Mackey | July 26, 1932 |
| 2,091,869 | McCurely | Aug. 31, 1937 |
| 2,467,681 | McKinney | Apr. 19, 1949 |
| 2,468,101 | Nampa | Apr. 26, 1949 |
| 2,476,362 | Fahland | July 19, 1949 |
| 2,497,683 | Nampa | Feb. 14, 1950 |
| 2,513,348 | Nampa | July 4, 1950 |
| 2,613,615 | Nampa | Oct. 14, 1952 |
| 2,725,826 | Tobin et al. | Dec. 9, 1955 |
| 2,743,022 | Mapson | Apr. 24, 1956 |

FOREIGN PATENTS

| | | |
|---|---|---|
| 741,980 | France | Dec. 20, 1932 |